(12) United States Patent
Suh

(10) Patent No.: US 12,211,085 B2
(45) Date of Patent: Jan. 28, 2025

(54) METHOD, DEVICE, AND SYSTEM FOR INTERACTIVE PRODUCT SHOPPING

(71) Applicant: GripCompany Co., Ltd., Seoul (KR)

(72) Inventor: Han Ah Suh, Seongnam-si (KR)

(73) Assignee: GripCompany Co., Ltd., Seoul (KR)

( * ) Notice: Subject to any disclaimer, the term of this patent is extended or adjusted under 35 U.S.C. 154(b) by 309 days.

(21) Appl. No.: 17/715,224

(22) Filed: Apr. 7, 2022

(65) Prior Publication Data

US 2023/0073134 A1    Mar. 9, 2023

(30) Foreign Application Priority Data

Sep. 9, 2021    (KR) .................. 10-2021-0120136

(51) Int. Cl.
*G06Q 30/00* (2023.01)
*G06Q 30/0601* (2023.01)

(52) U.S. Cl.
CPC ............................. *G06Q 30/0633* (2013.01)

(58) Field of Classification Search
CPC ............... G06Q 30/00; G06Q 30/0601; G06Q 30/0623; G06Q 30/0633; G06Q 30/0641
See application file for complete search history.

(56) References Cited

U.S. PATENT DOCUMENTS 6,731,788 B1 * 5/2004 Agnihotri .............. G11B 27/28
                                                  382/165
8,458,053 B1 * 6/2013 Buron ................. H04N 21/4316
                                                  705/26.1
8,660,912 B1 * 2/2014 Dandekar .............. G06Q 30/02
                                                  705/26.1
(Continued)

FOREIGN PATENT DOCUMENTS

KR    10-2016-0116193 A    10/2016
KR    10-2017-0059260 A     5/2017
(Continued)

OTHER PUBLICATIONS

Gupta, Swati. "Online shopping cart application." (2013). (Year: 2013).*

(Continued)

*Primary Examiner* — Christopher B Seibert
(74) *Attorney, Agent, or Firm* — Sughrue Mion, PLLC

(57) ABSTRACT

Disclosed is an interactive product shopping method including acquiring a real-time broadcast image related to the sale of a target product, acquiring product information of the target product, acquiring information on a sales method of the target product, acquiring input information and identification information of a candidate purchaser who requests to purchase the target product, determining a prospective purchaser of the target product on the basis of a quantity information of the target product and the input information of the candidate purchaser, acquiring shopping cart information of the prospective purchaser on the basis of the identification information of the prospective purchaser and assigning the product information of the target product to a shopping cart of the prospective purchaser, and acquiring payment intention information of the prospective purchaser and updating the sales status of the target product on the basis of the payment intention information.

8 Claims, 11 Drawing Sheets

(56) References Cited

U.S. PATENT DOCUMENTS

| | | | | |
|---|---|---|---|---|
| 8,977,554 | B1* | 3/2015 | Hertschuh | G06Q 30/0623 |
| | | | | 704/270 |
| 11,106,751 | B1* | 8/2021 | Kadayam | G06F 16/954 |
| 2007/0050406 | A1* | 3/2007 | Byers | G06F 16/48 |
| 2007/0106570 | A1* | 5/2007 | Hartman | G06Q 30/0605 |
| | | | | 705/26.8 |
| 2007/0112647 | A1* | 5/2007 | Borders | G06Q 30/016 |
| | | | | 705/26.81 |
| 2007/0294240 | A1* | 12/2007 | Steele | G06F 16/338 |
| | | | | 707/999.005 |
| 2008/0162684 | A1* | 7/2008 | Neyama | H04L 67/02 |
| | | | | 709/223 |
| 2009/0037291 | A1* | 2/2009 | Dawson | G06Q 30/0603 |
| | | | | 705/27.2 |
| 2010/0030578 | A1* | 2/2010 | Siddique | G06Q 20/12 |
| | | | | 705/26.1 |
| 2010/0114654 | A1* | 5/2010 | Lukose | G06Q 30/00 |
| | | | | 705/14.54 |
| 2012/0136756 | A1* | 5/2012 | Jitkoff | G06F 16/9577 |
| | | | | 715/224 |
| 2012/0197700 | A1* | 8/2012 | Kalin | G06Q 30/0633 |
| | | | | 705/26.8 |
| 2012/0233020 | A1* | 9/2012 | Eberstadt | G06Q 30/06 |
| | | | | 705/26.1 |
| 2013/0013427 | A1* | 1/2013 | Gonsalves | G06Q 30/02 |
| | | | | 705/27.1 |
| 2013/0215116 | A1* | 8/2013 | Siddique | G06Q 20/40 |
| | | | | 705/26.7 |
| 2014/0129393 | A1* | 5/2014 | Soon-Shiong | G06F 3/0484 |
| | | | | 705/27.2 |
| 2014/0136334 | A1* | 5/2014 | Lagassey | G06Q 30/0277 |
| | | | | 705/14.69 |
| 2014/0136990 | A1* | 5/2014 | Gonnen | H04L 51/18 |
| | | | | 715/752 |
| 2014/0237394 | A1* | 8/2014 | Park | H04L 51/06 |
| | | | | 715/758 |
| 2014/0297362 | A1* | 10/2014 | Kumar | G06Q 30/0253 |
| | | | | 705/7.29 |
| 2014/0297537 | A1* | 10/2014 | Kassemi | G06Q 20/401 |
| | | | | 705/67 |
| 2015/0052014 | A1* | 2/2015 | Mason | G06Q 30/0643 |
| | | | | 705/26.41 |
| 2015/0052061 | A1* | 2/2015 | Anderson | G06Q 20/409 |
| | | | | 705/44 |
| 2015/0088686 | A1* | 3/2015 | Glassberg | G06Q 50/01 |
| | | | | 705/26.8 |
| 2015/0149168 | A1* | 5/2015 | Stent | G10L 15/22 |
| | | | | 704/235 |
| 2015/0170256 | A1* | 6/2015 | Pettyjohn | G06Q 30/0603 |
| | | | | 705/26.9 |
| 2015/0317698 | A1* | 11/2015 | Kalyvas | G06Q 30/0214 |
| | | | | 705/14.66 |
| 2016/0371854 | A1* | 12/2016 | Gershon | G06Q 30/0643 |
| 2017/0032417 | A1* | 2/2017 | Amendjian | G06Q 30/0254 |
| 2017/0193434 | A1* | 7/2017 | Shah | G06V 20/10 |
| 2017/0200289 | A1* | 7/2017 | Gershon | G06V 10/751 |
| 2019/0378200 | A1* | 12/2019 | Costello | G06Q 30/0635 |
| 2020/0302510 | A1* | 9/2020 | Chachek | G06Q 30/0639 |

FOREIGN PATENT DOCUMENTS

| | | |
|---|---|---|
| KR | 10-2057001 B1 | 12/2019 |
| KR | 10-2068532 B1 | 1/2020 |
| KR | 10-2021-0108122 A | 9/2021 |

OTHER PUBLICATIONS

Wertenbroch, Klaus. "Consumption self-control by rationing purchase quantities of virtue and vice." Marketing science 17.4 (1998): 317-337. (Year: 1998).*

Office Action issued Mar. 18, 2024 in Korean Application No. 10-2022-0108964.

* cited by examiner

METHOD, DEVICE, AND SYSTEM FOR INTERACTIVE PRODUCT SHOPPING

CROSS-REFERENCE TO RELATED APPLICATION

This application claims priority to and the benefit of Korean Patent Application No. 10-2021-0120136, filed on Sep. 9, 2021, the disclosure of which is incorporated herein by reference in its entirety.

BACKGROUND

1. Field

The present disclosure relates to a method, device, and system for interactive product shopping, and more particularly, to a method, device, and system for interactive product shopping to sell (or purchase) products while a seller and a purchaser communicate with each other in real time.

2. Discussion of Related Art

As communication technology is developing and computing specifications advance, an interactive shopping system for selling or purchasing products through communication between a seller and a purchaser using a real-time broadcast has been attracting attention.

Conventional shopping systems have used a method of introducing products through a real-time broadcast without product registration and then allowing a purchaser to directly pay for purchased products using payment window products. Here, a payment window product refers to a product for "payment" that exists separately from a product purchased by a purchaser in order to pay for the purchased product. In addition, products have been sold or purchased without product registration, and thus product information of the sold or purchased products was manually recorded or captured to manage the sales status of the products.

However, conventional shopping systems manage the sales status of products on the basis of handwritten product information, and thus there is a limitation in managing the sales status or delivery status of products. In addition, since conventional shopping systems perform payment through payment window products, reviews of various products are registered in the payment window review, causing inconvenience to users. Also, there is a problem in that conventional shopping systems are vulnerable in terms of preventing a no-show of a purchaser who has expressed his or her purchase intention due to a limitation in managing the sales status of products.

Accordingly, there is a need to develop an interactive product shopping method, an interactive product shopping device, and an interactive product shopping system for efficiently managing product status.

SUMMARY

An object of the present invention is to provide an interactive product shopping method, an interactive product shopping device, and an interactive product shopping system for selling or purchasing products in real time.

The objects of the invention are not limited to the above-described object, and other objects that are not described herein should be clearly understood by those skilled in the art from the following description and the accompanying drawings.

According to an embodiment of the present disclosure, an interactive product shopping method may include operations of acquiring a real-time broadcast image related to the sale of a target product, acquiring product information of the target product, wherein the product information includes photo information, quantity information, and price information of the target product, acquiring information on a sales method of the target product, wherein the sales method is related to at least one of a first-come-first-served sales method, an auction sale method, a lottery sales method, and/or a general sales method, acquiring input information and identification information of a candidate purchaser who requests to purchase the target product, determining a prospective purchaser of the target product on the basis of the quantity information of the target product and the input information of the candidate purchaser, acquiring shopping cart information of the prospective purchaser on the basis of the identification information of the prospective purchaser and assigning the product information of the target product to a shopping cart of the prospective purchaser, and acquiring payment intention information of the prospective purchaser and updating the sales status of the target product on the basis of the payment intention information.

According to an embodiment of the present disclosure, a server may include a transceiver configured to perform data communication with the seller terminal or the purchaser terminal and a processor configured to interactively determine a prospective purchaser of a product, wherein the processor is configured to acquire a real-time broadcast image related to the sale of a target product, acquire product information of the target product, the product information including photo information, quantity information, and price information of the target product, acquire information on a sales method of the target product, the sales method being related to at least one of a first-come-first-served sales method, an auction sale method, a lottery sales method, and/or a general sales method, acquire input information and identification information of a candidate purchaser who requests to purchase the target product, determine a prospective purchaser of the target product on the basis of the quantity information of the target product and the input information of the candidate purchaser, acquire shopping cart information of the prospective purchaser on the basis of the identification information of the prospective purchaser and assign the product information of the target product to a shopping cart of the prospective purchaser, and acquire payment intention information of the prospective purchaser and update a sales status of the target product on the basis of the payment intention information.

The solutions of the invention are not limited to the above-described solutions, and other solutions that are not described herein should be clearly understood by those skilled in the art from the following description and the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
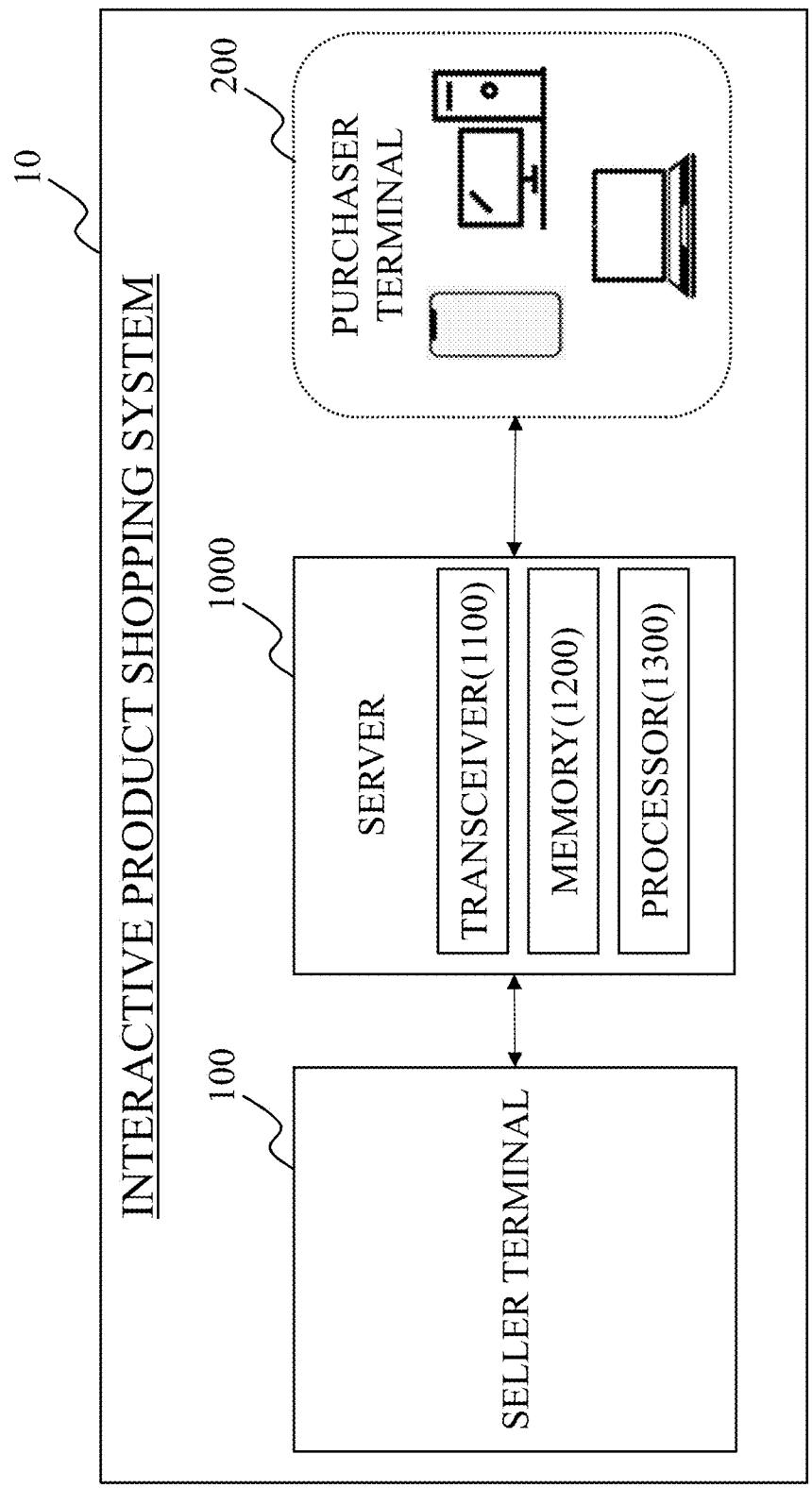
FIG. 1 is a schematic diagram showing an interactive product shopping system according to an embodiment of the present disclosure.

The above objects, features, and advantages of the present disclosure will become more apparent from the following detailed description taken in conjunction with the accompanying drawings. However, since the present disclosure may be variously modified and have several exemplary embodiments, specific exemplary embodiments will be shown in the accompanying drawings and described in detail.

Like reference numerals refer to like elements throughout the specification. Further, like reference numerals will be used to designate like elements within the same scope shown in the drawings of the embodiments, and a relevant description thereof will be omitted.

Detailed descriptions about well-known functions or configurations associated with the present invention will be omitted in order to not unnecessarily obscure the subject matter of the present invention. Also, ordinal numbers (e.g., first, second, etc.) used in the following description are merely identification symbols for distinguishing one element from another element.

The suffixes "module" and "unit" for elements used in the following embodiments are given or used interchangeably only for ease of writing this specification, and thus the suffixes are not assigned a specific meaning or function.

As used herein, the singular forms "a," "an," and "one" are intended to include the plural forms as well, unless the context clearly indicates otherwise.

It should be further understood that the terms "comprises" and/or "comprising" used herein specify the presence of stated features or components but do not preclude the presence or addition of one or more other features or components.

In the drawings, the components may be exaggerated or reduced in size for convenience of description. For example, since the sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

In the following embodiments, when elements are connected to each other, the elements are connected to each other not only directly but also indirectly with other elements interposed therebetween.

For example, in the following embodiments, when elements are electrically connected to each other, the elements are electrically connected to each other not only directly but also indirectly with other elements interposed therebetween.

According to an embodiment of the present disclosure, an interactive product shopping method may include operations of acquiring a real-time broadcast image related to the sale of a target product, acquiring product information of the target product, wherein the product information includes photo information, quantity information, and price information of the target product, acquiring information on a sales method of the target product, wherein the sales method is related to at least one of a first-come-first-served sales method, an auction sale method, a lottery sales method, and/or a general sales method, acquiring input information and identification information of a candidate purchaser who requests to purchase the target product, determining a prospective purchaser of the target product on the basis of the quantity information of the target product and the input information of the candidate purchaser, acquiring shopping cart information of the prospective purchaser on the basis of the identification information of the prospective purchaser and assigning the product information of the target product to a shopping cart of the prospective purchaser, and acquiring payment intention information of the prospective purchaser and updating the sales status of the target product on the basis of the payment intention information.

According to an embodiment of the present disclosure, the operation of updating the sales status of the target product may include operations of acquiring end time information on an end time at which a real-time broadcast related to the sale of the target product ends, determining whether a prospective purchaser's payment for the target product is completed by a predetermined time after the end time, and updating the sales status according to whether the prospective purchaser's payment is completed, wherein when the payment is completed, the sales status of the target product related to the prospective purchaser is updated to a first status indicating that the payment is completed, and wherein when the payment is not completed, the sales status of the target product related to the prospective purchaser is updated to a second status indicating that the payment is not completed.

According to an embodiment of the present disclosure, the operation of updating the sales status according to whether the prospective purchaser's payment is completed may include operations of imposing a penalty on the prospective purchaser when the payment is not completed, determining whether the number of times the penalty is imposed is greater than or equal to a predetermined threshold number, and restricting a purchase request of the prospective purchaser for a predetermined period on the basis of a result of the determination.

According to an embodiment of the present disclosure, the operation of updating the sales status of the target product may include operations of acquiring a deletion input for the product information of the target product assigned to the shopping cart from the prospective purchaser, determining whether the deletion input is acquired while a real-time broadcast is in progress, and updating the sales status according to when the deletion input is acquired, wherein when the deletion input is acquired while the real-time broadcast is in progress, the sales status of the target product related to the prospective purchaser is updated to a third status indicating that the target product is deleted from the shopping cart during the broadcast, and wherein when the deletion input is acquired after the real-time broadcast ends, the sales status of the target product related to the prospective purchaser is updated to a fourth status indicating that the target product is deleted from the shopping cart after the broadcast.

According to an embodiment of the present disclosure, the interactive product shopping method may further include operations of imposing a penalty on the prospective purchaser when the deletion input is acquired after the real-time broadcast ends, determining whether the number of times the penalty is imposed is greater than or equal to a predetermined threshold number, and restricting a purchase request of the prospective purchaser for a predetermined period on the basis of a result of the determination.

According to an embodiment of the present disclosure, the operation of acquiring the product information of the target product may include operations of transmitting a signal requesting photographing of the target product and acquiring photo information of the photographed target product in response to the request.

According to an embodiment of the present disclosure, the operation of determining the prospective purchaser of the target product may include operations of determining whether the target product is in stock on the basis of the quantity information of the target product and determining the candidate purchaser as the prospective purchaser on the basis of a result of determining that the target product is in stock.

According to an aspect of the present disclosure, there may be provided a computer-readable recording medium having a program recorded thereon to execute the interactive product shopping method.

According to an embodiment of the present disclosure, a server may include a transceiver configured to perform data communication with the seller terminal or the purchaser terminal and a processor configured to interactively determine a prospective purchaser of a product, wherein the processor is configured to acquire a real-time broadcast image related to the sale of a target product, acquire product information of the target product, the product information including photo information, quantity information, and price information of the target product, acquire information on a sales method of the target product, the sales method being related to at least one of a first-come-first-served sales method, an auction sale method, a lottery sales method, and/or a general sales method, acquire input information and identification information of a candidate purchaser who requests to purchase the target product, determine a prospective purchaser of the target product on the basis of the quantity information of the target product and the input information of the candidate purchaser, acquire shopping cart information of the prospective purchaser on the basis of the identification information of the prospective purchaser and assign the product information of the target product to a shopping cart of the prospective purchaser, and acquire payment intention information of the prospective purchaser and update a sales status of the target product on the basis of the payment intention information.

Hereinafter, an interactive product shopping method, an interactive product shopping device, and an interactive product shopping system of the present disclosure will be described with reference to FIGS. 1 to 11.

FIG. 1 is a schematic diagram showing an interactive product shopping system 10 according to an embodiment of the present disclosure.

The interactive product shopping system 10 according to the embodiment of the present disclosure may include a seller terminal 100, a purchaser terminal 200, and a server (or an interactive product shopping device) 1000.

The seller terminal 100 may acquire a product-sales-related real-time broadcast image. The seller terminal 100 may acquire a product-sales-related real-time broadcast image through any photographing unit (e.g., a camera). Also, the seller terminal 100 may acquire any product-sales-related data. For example, the seller terminal 100 may acquire product information (e.g., quantity information, price information, photo information, and product names of products, etc.) or product-sale-method-related information (e.g., a first-come-first-served sales method, an auction sales method, a lottery sales method, a general sales method, etc.) through any input unit (e.g., a touchpad, a mouse, a keyboard, a microphone, etc.).

The purchaser terminal 200 may acquire and output a real-time broadcast image to a purchaser and acquire the purchaser's product-purchase-related input. For example, the purchaser terminal 200 may output a real-time broadcast image through any output unit (e.g., a display, a speaker, a monitor, etc.) and may acquire any product-purchase-related information including the purchaser's input for requesting to purchase a product or requesting to pay for a product through any input unit (e.g., a touchpad, a mouse, a keyboard, a microphone, etc.).

The server 1000 of the interactive product shopping system 10 according to the embodiment of the present disclosure may determine a prospective purchaser or update the sales status of a target product on the basis of various kinds of information including real-time broadcast images, product information, sales method information, purchase request information, payment information, and the like acquired from the seller terminal 100 or the purchaser terminal 200.

The server 1000 according to the embodiment of the present disclosure may include a transceiver 1100, a memory 1200, and a processor 1300.

The transceiver 1100 of the server 1000 may perform communication with any external devices including the seller terminal 100 and/or the purchaser terminal 200. For example, the server 1000 may transmit and receive product-sales-related real-time broadcast images through the transceiver 1100. For example, the server 1000 may receive product information of products and/or information on sales methods through the transceiver 1100. Also, the server 1000 may acquire input information for requesting to purchase a product and/or identification information of a candidate purchaser through the transceiver 1100.

Through the transceiver 1100, the server 1000 may access a network and transmit and receive various kinds of data. The transceiver 1100 may largely include a wired-type unit and a wireless-type unit. Since the wired-type unit and the wireless-type unit have respective advantages and disadvantages, in some cases, the server 1000 may be provided with both the wired-type unit and the wireless-type unit. Here, the wireless-type unit may mainly use a wireless local area network (WLAN)-based communication scheme, such as Wi-Fi. Alternatively, the wireless-type unit may use a cellular communication scheme, for example, Long-Term Evolution (LTE) or a 5G communication scheme. However, a wireless communication protocol is not limited to the above examples, and it is possible to use any appropriate wireless-type communication scheme. A representative example of the wired-type unit may use local area network (LAN) or universal serial bus (USB) communication, and other communication schemes are possible.

The memory 1200 of the server 1000 may store various kinds of information. Various kinds of data may be temporarily or semi-permanently stored in the memory 1200. Examples of the memory 1200 may include a hard disk drive (HDD), a solid-state drive (SSD), a flash memory, a read-only memory (ROM), a random access memory (RAM), etc. The memory 1200 may be built into, or detachable from, the server 1000. Various kinds of data necessary for the operation of the server 1000 may be stored in the memory 1200 in addition to an operating system for driving the server 1000 or a program for operating each component of the server 1000.

The processor 1300 may control the overall operation of the server 1000. For example, the processor 1300 may perform the overall operation of the server 1000, such as an operation of acquiring a real-time broadcast image and any product-sales-related or product-purchase-related information, an operation of determining a prospective purchaser, an operation of assigning product information to the prospective purchaser's shopping cart, and an operation of updating the sales status of a product on the basis of payment intention information, which will be described below. Specifically, the processor 1300 may load a program for the overall operation of the server 1000 from the memory 1200 and execute the program. The processor 1300 may be implemented as an application processor (AP), a central processing unit (CPU), a microcontroller unit (MCU) or the like in hardware, software, or a combination thereof. In this case, in terms of hardware, the processor 1300 may be provided in the form of an electronic circuit for processing an electrical signal to perform a control function, and in terms of software, the processor 1300 may be provided in the form of a program or code for driving a hardware circuit.

The operation of the interactive product shopping system 10 according to the embodiment of the present disclosure will be described below with reference to FIGS. 2 to 11.

The server 1000 of the interactive product shopping system 10 according to the embodiment of the present disclosure may transmit a real-time product sale image and determine a prospective purchaser in response to a purchase request of a purchaser. Also, depending on the payment intention of the determined prospective purchaser, the server 1000 may perform an operation of updating the sales status of the product or giving a penalty to the prospective purchaser.

Figure 2:
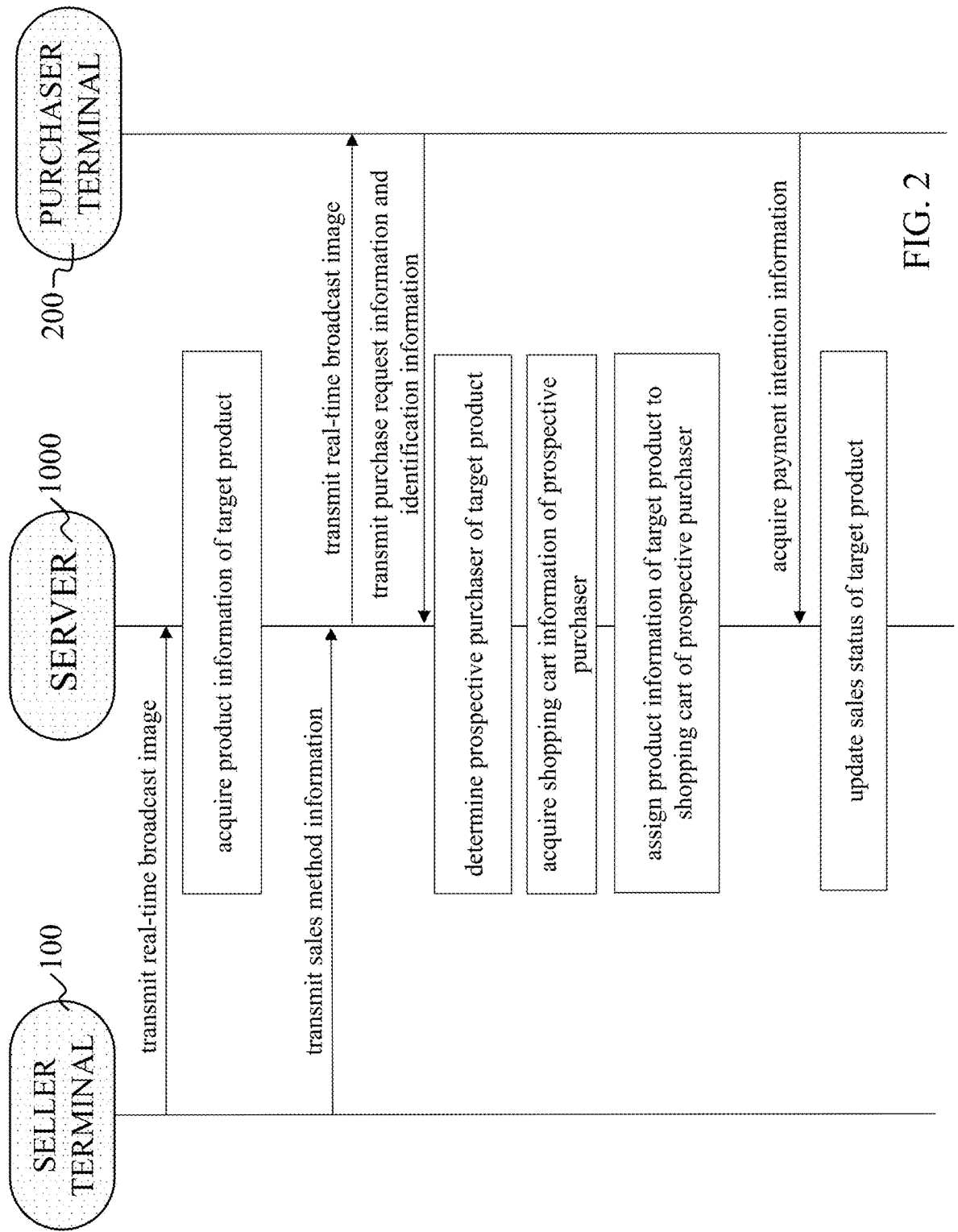
FIG. 2 is a diagram showing operations of an interactive product shopping system according to an embodiment of the present disclosure.

FIG. 2 is a diagram showing operations of the interactive product shopping system 10 according to the embodiment of the present disclosure.

The server 1000 according to the embodiment of the present disclosure may receive a real-time broadcast image from the seller terminal 100 and transmit the real-time broadcast image to the purchaser terminal 200. In detail, the server 1000 may receive a photographed real-time broadcast image from the seller terminal 100 through the transceiver 1100. Also, the server 1000 may transmit a real-time broadcast image to the purchaser terminal 200 through the transceiver 1100.

The server 1000 according to the embodiment of the present disclosure may acquire product information of a target product to be sold. Here, the product information may encompass any information related to the target product, that is, quantity information, price information, photo information, seller information, a product name, and/or the like of the target product.

As an example, a seller may input the product information of the target product to the seller terminal 100 through any input unit (e.g., a touchpad, a keyboard, a mouse, etc.) of the seller terminal 100. As another example, a seller may input the product information, and particularly photo information, of the target product to the seller terminal 100 through any photographing unit (e.g., a camera, etc.) of the seller terminal 100. In this case, the seller terminal 100 may transmit the product information of the target product to the server 1000 through any transceiver.

As another example, a purchaser may input the product information of the target product to the purchaser terminal 200 through any input unit (e.g., a touchpad, a keyboard, a mouse, a button, etc.) of the purchaser terminal 200. As an example, the purchaser terminal 200 may acquire the product information (e.g., photo information) of the target product through a user's input that indicates an instruction for capturing a target product included in a real-time image. Alternatively, the purchaser terminal 200 may acquire the product information (e.g., price information) of the target product through a user's input. In this case, the purchaser terminal 200 may transmit the product information of the target product to the server 1000 through any transceiver.

The server 1000 according to the embodiment of the present disclosure may acquire information on the sales method for the target product. Here, the information on the sales method may encompass any method related to the sale of the target product, that is, a first-come-first-served sales method, an auction sales method, a lottery sales method, and/or a general sales method. As an example, a seller may input the information on the sales method of the target product to the seller terminal 100 through any input unit (e.g., a touchpad, a keyboard, a mouse, etc.) of the seller terminal 100. In this case, the seller terminal 100 may transmit the sales method information of the target product to the server 1000 through any transceiver.

The server 1000 according to the embodiment of the present disclosure may acquire purchase request information for the target product. As an example, at least one purchaser may input an input for requesting to purchase the target product to the purchaser terminal 200 through any input unit (e.g., a touchpad, a keyboard, a mouse, etc.) of the purchaser terminal 200. In this case, the purchaser terminal 200 may transmit the purchase request information for the target product to the server 1000 through any transceiver.

Also, the server 1000 according to the embodiment of the present disclosure may acquire identification information of a candidate purchaser corresponding to the purchaser request information. For example, the server 1000 may acquire identification information (e.g., ID information, purchaser terminal information and/or identity information, nickname information, etc.) of the purchaser who has input the purchase request from the purchaser terminal 200.

The server 1000 according to the embodiment of the present disclosure may determine the prospective purchaser of the target product in response to the purchase request of the candidate purchaser. Specifically, the server 1000 may be implemented to determine the prospective purchaser of the target product on the basis of the purchase request information of the candidate purchaser and quantity information of the target product. As an example, the server 1000 may determine whether the target product is in stock on the basis of the quantity information of the target product and may determine a prospective purchaser on the basis of a result of the determination. This will be described in detail with reference to FIG. 6.

The server 1000 according to the embodiment of the present disclosure may be implemented to acquire shopping cart information of the determined prospective purchaser and assign the product information of the target product to the prospective purchaser's shopping cart. Specifically, the server 1000 may acquire shopping cart information corresponding to the prospective purchaser on the basis of the identification information of the prospective purchaser and may assign the product information of the target product to the shopping cart of the prospective purchaser. The prospective purchaser may check information on the shopping cart to which the product information of the target product is assigned, through any output unit (e.g., a monitor, a display, a speaker, etc.) of the purchaser terminal 200. Also, the prospective purchaser may input an input for requesting to pay for the target product or an input for deleting the target product from the shopping cart to the purchaser terminal 200 through any input unit (e.g., a touchpad, a keyboard, a mouse, etc.) of the purchaser terminal 200.

The server 1000 according to the embodiment of the present disclosure may acquire payment intention information or deletion information. Specifically, the server 1000 may acquire payment intention information from the purchaser terminal 200 through the transceiver 1100. Here, the payment intention information may refer to information related to whether an input for requesting to pay for the target product has been received within a predetermined time.

Also, although not shown in FIG. 2, the server 1000 may receive an input for requesting a deletion of the target product from the shopping cart. Specifically, the prospective purchaser may input an input for deleting the target product from the shopping cart to the purchaser terminal 200 through any input unit (e.g., a touchpad, a keyboard, a mouse, etc.) of the purchaser terminal 200. In this case, the server 1000 may acquire deletion information related to the input for requesting the deletion of the target product from the shopping cart from the purchaser terminal 200 through the transceiver 1100.

The server 1000 according to the embodiment of the present disclosure may perform an operation of updating the sales status of the target product on the basis of the payment intention information for the target product of the prospective purchaser. For example, the server 1000 may update the sales status of the target product related to the prospective purchaser according to whether a payment request for the target product has been acquired by a predetermined reference payment time.

Also, the server 1000 according to the embodiment of the present disclosure may perform an operation of updating the sales status of the target product on the basis of the deletion information for the target product of the prospective purchaser. For example, the server 1000 may update the sales status of the target product related to the prospective purchaser on the basis of whether the deletion request for the target product has been acquired during a real-time broadcast.

The update of the sales status of the target product will be described in more detail with reference to FIGS. 8 to 10.

The server 1000 according to the embodiment of the present disclosure may perform an operation of giving a penalty to a determined prospective purchaser who is regarded as depriving other consumers of purchase opportunities because the prospective purchaser has not completed the payment by the reference payment time or has requested a deletion of the target product from the shipping cart after the real-time broadcast ends. Specifically, the server 1000 may be implemented to determine whether the number of times a penalty is given is greater than or equal to a predetermined threshold number and implemented to update the cumulative number of times the penalty is given or restrict a purchase request of the prospective purchaser depending on a result of the determination. The giving of the penalty will be described in more detail with reference to FIG. 11.

Figure 3:
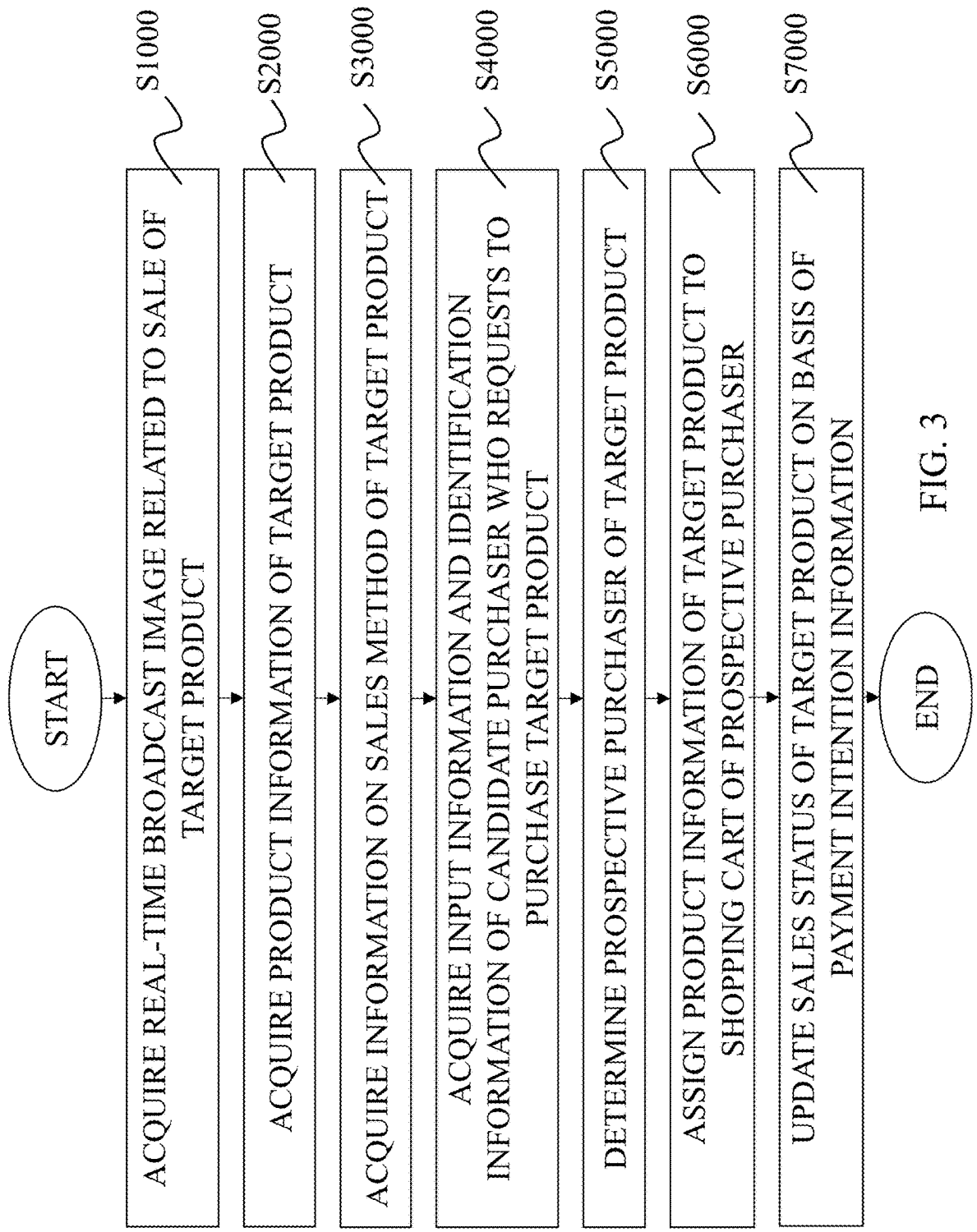
FIG. 3 is a flowchart of an interactive product shopping method according to an embodiment of the present disclosure.

See FIG. 3. FIG. 3 is a flowchart of an interactive product shopping method according to an embodiment of the present disclosure.

The interactive product shopping method according to the embodiment of the present disclosure may include operations of acquiring a real-lime broadcast image related to the sale of a target product (S1000), acquiring product information of the target product (S2000), acquiring information on a sales method of the target product (S3000), acquiring input information and identification information of a candidate purchaser who requests to purchase the target product (S4000), determining a prospective purchaser of the target product (S5000), assigning product information of the target product to a shopping cart of the prospective purchaser (S6000), and updating the sales status of the target product on the basis of payment intention information (S7000).

In the operation of acquiring the real-time broadcast image related to the sale of the target product (S1000), a server 1000 may acquire the real-time broadcast image related to the sale of the target product from a seller terminal 100.

In the operation of acquiring the product information of the target product (S2000), the server 1000 may acquire the product information of the target product. Here, as described above, the product information may encompass any information related to the target product, that is, quantity information, price information, photo information, seller information, product name information, and/or the like of the target product.

As an example, the server 1000 may acquire the acquired product information of the target product through any input unit (e.g., a mouse, a keyboard, a touchpad, etc.) of the seller terminal 100. For example, a seller may input the quantity information, price information, photo information, seller information, product name information, etc., of the target product through any input unit (e.g., a mouse, a keyboard, a touchpad, etc.) of the seller terminal 100. In this case, the server 1000 may acquire the product information of the target product from the seller terminal 100 through the transceiver 1100.

As another example, the server 1000 may input the product information, particularly photo information, of the target product to the seller terminal 100 through any photographing unit (e.g., a camera, etc.) of the seller terminal 100. In this case, the server 1000 may acquire the photo information of the target product from the seller terminal 100 through the transceiver 1100.

As another example, the server 1000 may recognize a target product included in a real-time broadcast image and acquire product information of the target product stored in a product database. In this case, the product information of the target product may be prestored in the product database. Specifically, the server 1000 may recognize the target product on the basis of the similarity between the photo information of the target product stored in the product database and the photo information of the target product photographed in the real-time broadcast image. Also, the server 1000 may be implemented to acquire product information corresponding to the target product from the product database.

Meanwhile, the server 1000 according to the embodiment of the present disclosure may be implemented to modify or add to the product information of the target product. For example, the server 1000 may acquire the seller's input for modifying the product information of the target product in the real-time broadcast. The server 1000 may modify, change, or add to the product information of the target product in response to the seller's input.

An aspect of acquiring the photo information of the target product according to an embodiment of the present disclosure will be described below with reference to FIGS. 4 and 5.

Figure 4:
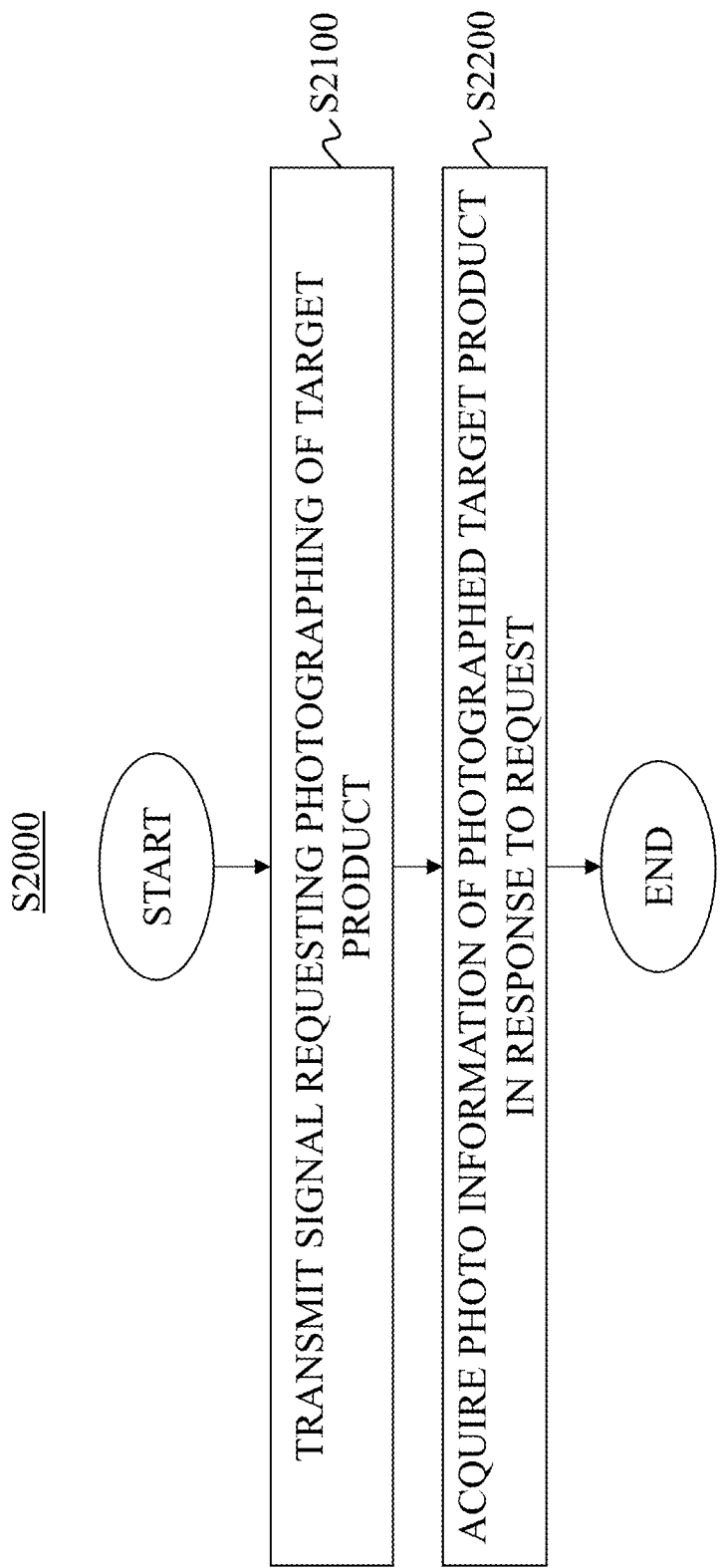
FIG. 4 is a detailed flowchart of an operation of acquiring product information of a target product according to an embodiment of the present disclosure.
Figure 5:
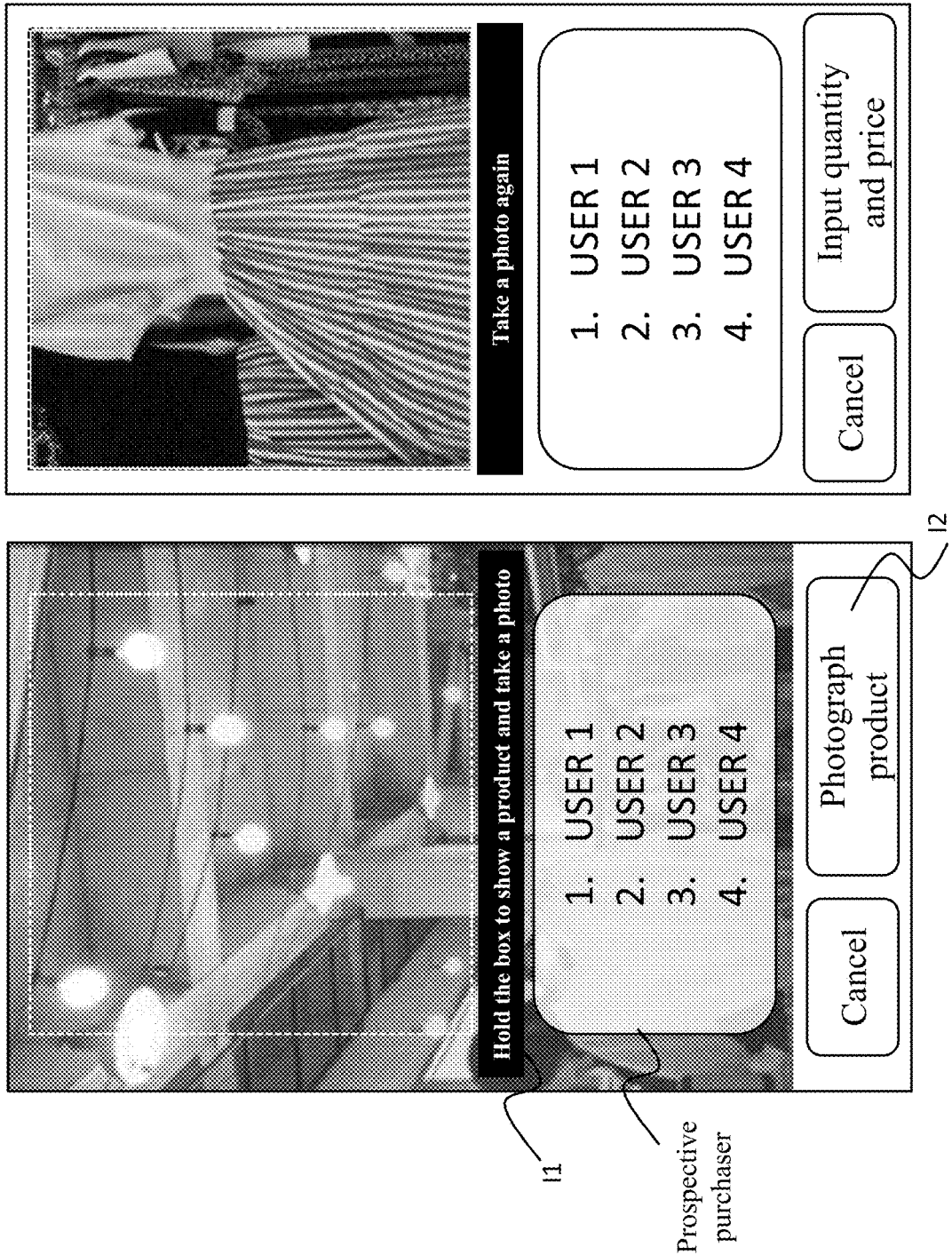
FIG. 5 is a diagram showing an aspect of acquiring product information of a target product according to an embodiment of the present disclosure.

FIG. 4 is a detailed flowchart of the operation of acquiring the product information of the target product (S2000) according to an embodiment of the present disclosure. FIG. 5 is a diagram showing an aspect of acquiring the product information of the target product according to an embodiment of the present disclosure.

The operation of acquiring the product information of the target product (S2000) may include operations of transmitting a signal requesting photographing of the target product (S2100) and acquiring photo information of the photographed target product in response to the request (S2200).

In the operation of transmitting a signal requesting photographing of the target product (S2100), the server 1000 may transmit the signal requesting photographing of the target product to the seller terminal 100 through the transceiver 1100. The seller terminal 100 may output information (e.g., I1 and I2 of FIG. 5) for requesting photographing of the target product through any output unit (e.g., a display, a speaker, a monitor, etc.) on the basis of the photographing request signal. Also, the seller terminal 100 may acquire the photo information of the target product through any photographing unit (e.g., a camera, etc.) and transmit the photo information of the target product to the server 1000.

In the operation of acquiring the photo information of the photographed target product in response to the request (S2200), the server 1000 may acquire the photo information of the target product from the seller terminal 100 through the transceiver 1100. For example, the server 1000 may be implemented to acquire a plurality of pieces of photo information of the target product and select a piece of photo information that has excellent quality or from which product recognition is easy from the photo information.

In the operation of acquiring information on a sales method of the target product (S3000), the server 1000 may acquire information on the sales method of the target product. Here, as described above, the information on the sales method may encompass any method related to the sale of the target product, that is, a first-come-first-served sales method, an auction sales method, a lottery sales method, and/or a general sales method. As an example, a seller may input the information on the sales method of the target product to the seller terminal 100 through any input unit (e.g., a touchpad, a keyboard, a mouse, etc.). In this case, the seller terminal 100 may transmit the sales method information of the target product to the server 1000 through any transceiver.

In the operation of acquiring input information and identification information of a candidate purchaser who requests to purchase the target product (S4000), the server 1000 may acquire the input information of the prospective purchaser who requests to purchase the target product. As an example, at least one purchaser (hereinafter referred to as a candidate purchaser) may input an input for requesting to purchase the target product to the purchaser terminal 200 through any input unit (e.g., a touchpad, a keyboard, a mouse, etc.) of the purchaser terminal 200. In this case, the purchaser terminal 200 may transmit the input information of the candidate purchaser for the target product to the server 1000 through any transceiver.

Meanwhile, the input for requesting a purchase may be acquired by clicking a purchase request button or recognizing a phrase (e.g., me, purchase, etc.) requesting a purchase in a chat window. Specifically, when the candidate purchaser requests a purchase through the chat window, the server 1000 may be implemented to detect a phrase in the chat window and determine whether the detected phrase is a purchase request phrase. When the detected phrase is a purchase request phrase, the server 1000 may be implemented to determine whether a candidate purchaser who has input the phrase is a prospective purchaser.

However, the above description is only exemplary, and the server 1000 may acquire purchase request information of the candidate purchaser using any suitable method.

Also, in the operation of acquiring input information and identification information of a candidate purchaser who requests to purchase the target product (S4000), the server 1000 may acquire the identification information of the candidate purchaser corresponding to the purchase request information. As an example, the server 1000 may acquire identification information (e.g., ID information, purchaser terminal information and/or identity information, nickname information, etc.) of the candidate purchaser who has input the purchase request.

In the operation of determining a prospective purchaser of the target product (S5000), the server 1000 may determine the prospective purchaser of the target product on the basis of the product information of the target product and the input information of the candidate purchaser. Specifically, the server 1000 may determine the prospective purchaser of the target product on the basis of the quantity information of the target product and the input information of the candidate purchaser who has requested to purchase the target product.

Figure 6:
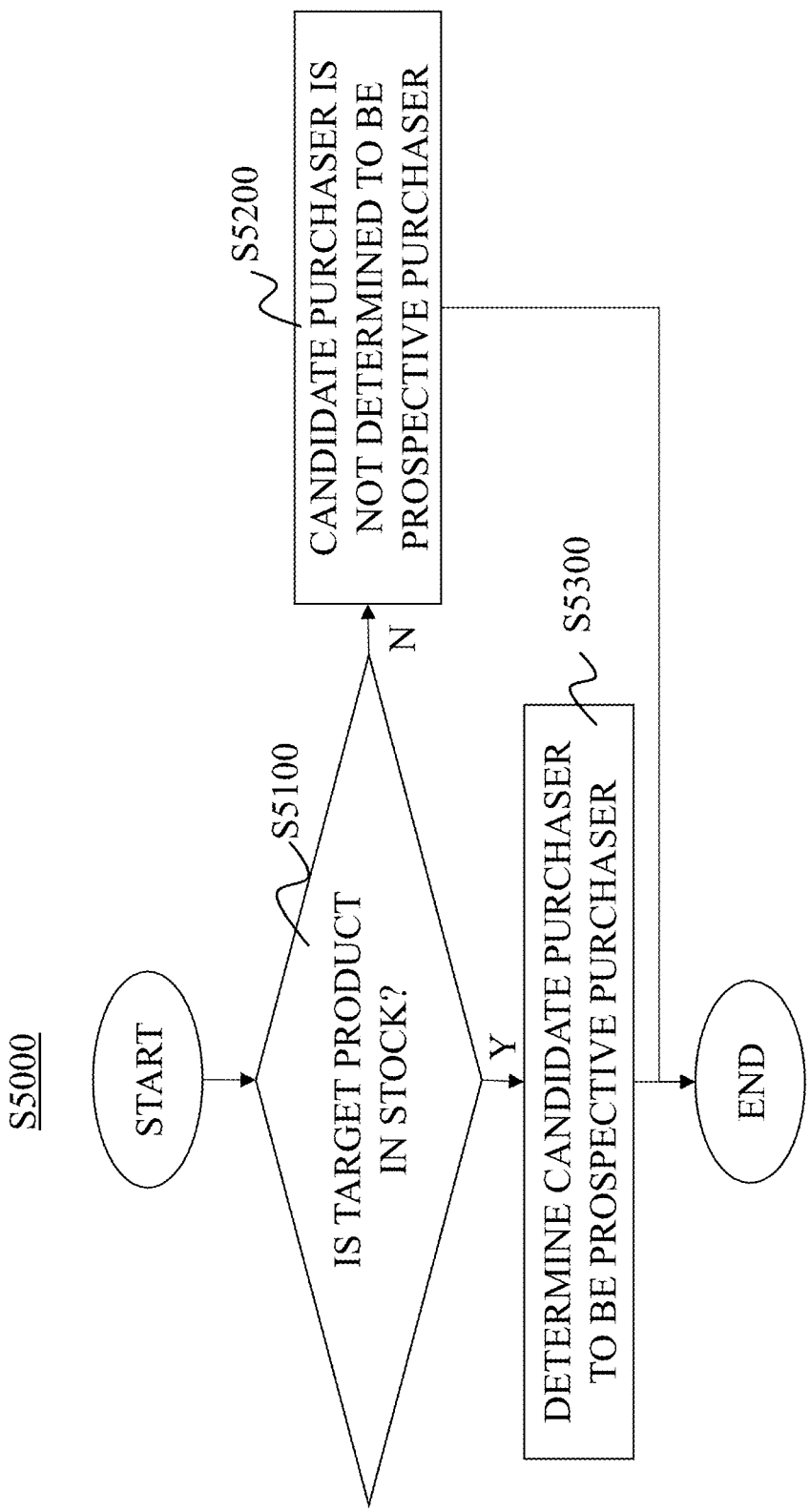
FIG. 6 is a detailed flowchart of an operation of determining a prospective purchaser of a target product according to an embodiment of the present disclosure.

See FIG. 6. FIG. 6 is a detailed flowchart of the operation of determining a prospective purchaser of the target product (S5000) according to an embodiment of the present disclosure.

The operation of determining a prospective purchaser of the target product (S5000) according to the embodiment of the present disclosure may include operations of determining whether the target product is in stock (S5100), determining that the candidate purchaser is not a prospective purchaser when the target product is not in stock (S5200), and determining that the candidate purchaser is a prospective purchaser when the target product is in stock (S5300).

In the operation of determining whether the target product is in stock (S5100), the server 1000 may determine whether the target product is in stock on the basis of the quantity information of the target product and input information of candidate purchasers determined to be prospective purchasers earlier than the candidate purchaser (hereinafter referred to as previous prospective purchasers). Specifically, the server 1000 may calculate total purchase quantity information of the target product of the previous prospective purchasers on the basis of the input information of the previous prospective purchasers. Also, the server 1000 may compare the total purchase quantity information of the target product to the quantity information of the target product to determine whether the target product is in stock.

As an example, when the total purchase quantity of the target product of the previous prospective purchasers is smaller than the quantity of the target product, the server 1000 may determine that the target product is in stock.

As another example, when the total purchase quantity of the target product of the previous prospective purchasers is greater than or equal to the quantity of the target product, the server 1000 may determine that the target product is not in stock.

The server 1000 may be implemented to determine that the candidate purchaser is not a prospective purchaser when the target product is not in stock (S5200).

On the other hand, the server 1000 may be implemented to determine that the candidate purchaser is a prospective purchaser when the target product is in stock (S5300).

However, the above method of determining the prospective purchaser is only exemplary, and the server 1000 may be implemented to rationally determine the prospective purchaser using any suitable method.

For example, the server 1000 may acquire penalty history information, report information, etc. and may determine a prospective purchaser on the basis of the penalty history information and/or the report information (e.g., information reported to other users or information reported through profanity, slang, and the like by chat window text analysis). Specifically, there is a need to prioritize candidate purchasers. As an example, when an input for requesting a purchase is acquired from at least two or more candidate purchasers at substantially the same time, there may be a need to prioritize the candidate purchasers. In this case, the server 1000 may compare penalty history information between the candidate purchasers or compare report information between the candidate purchasers to determine the prospective purchaser. For example, the server 1000 may be implemented to determine that a candidate purchaser penalized less frequently is a prospective purchaser. For example, the server 1000 may be implemented to determine that a candidate purchaser reported less frequently is a prospective purchaser.

In the operation of assigning product information of the target product to a shopping cart of the prospective purchaser (S6000), the server 1000 may acquire shopping cart information of the prospective purchaser on the basis of the identification information of the prospective purchaser and may assign the product information of the target product to a shopping cart of the prospective purchaser.

Figure 7:
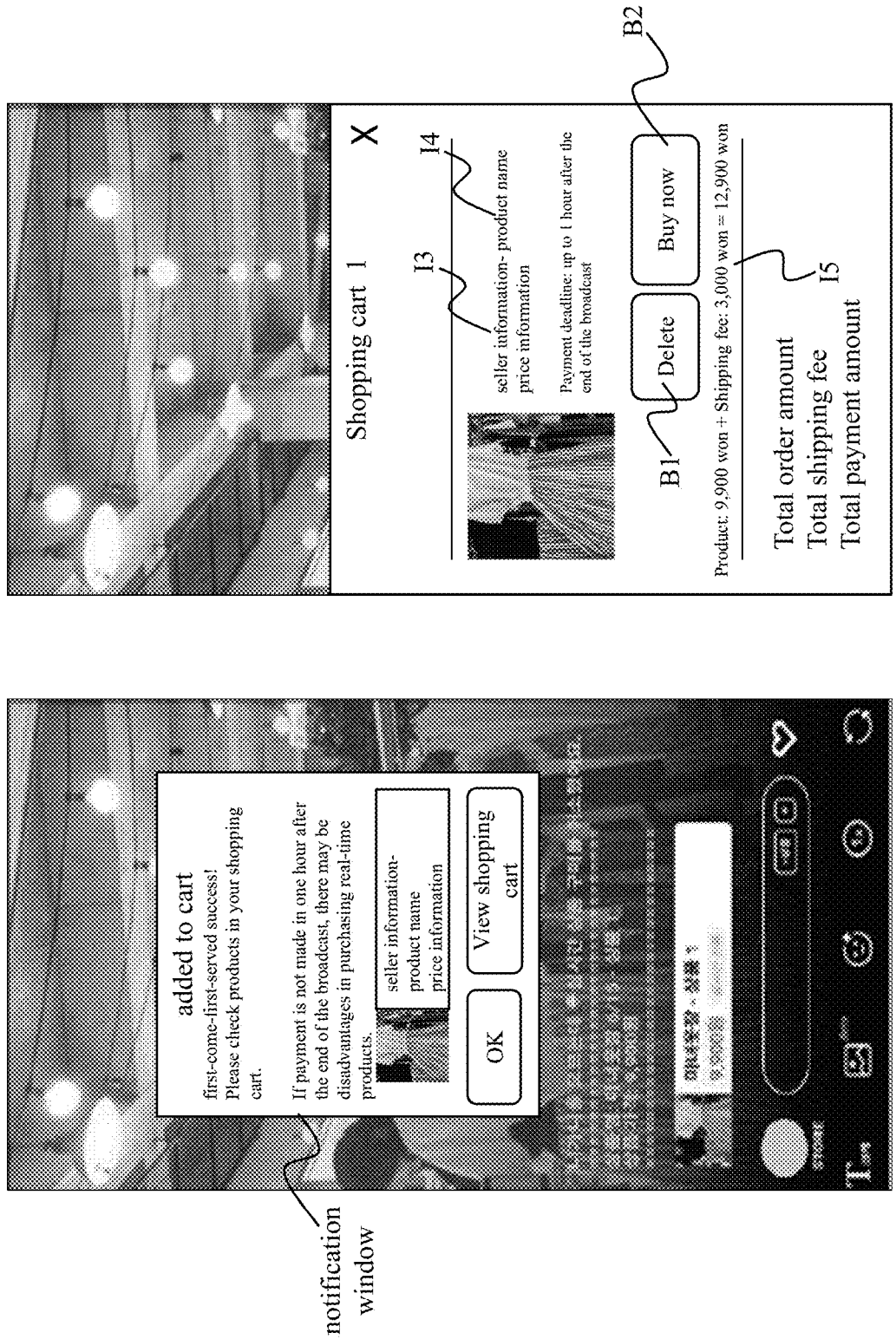
FIG. 7 is a diagram showing an aspect of an interface output through an output unit of a purchaser terminal when product information of a target product is assigned to a prospective purchaser's shopping cart according to an embodiment of the present disclosure.

See FIG. 7. FIG. 7 is a diagram showing an aspect of an interface output through an output unit of the purchaser terminal 200 when product information of a target product is assigned to a prospective purchaser's shopping cart according to an embodiment of the present disclosure.

According to an embodiment of the present disclosure, the server 1000 may assign the product information of the target product to the prospective purchaser's shopping cart. In this case, the server 1000 may be implemented to output a notification window indicating that the target product is assigned to the shopping cart through the output unit of the purchaser terminal 200 of the prospective purchaser.

Also, the server 1000 may be implemented to output seller information (e.g., I3 in FIG. 7), the product information of the target product (e.g., I4 in FIG. 7), delivery information (e.g., I3 in FIG. 7), a deletion button (e.g., B1 in FIG. 7), and/or a payment request button (e.g., B2 in FIG. 7) through the output unit of the purchaser terminal 200 of the prospective purchaser. However, the interface shown in FIG. 7 is merely exemplary, and any suitable information may be provided to the user in any suitable form.

Meanwhile, the prospective purchaser may input a request to pay for the target product or a request for deleting the target product from the shopping cart on the basis of the shopping cart to which the target product is assigned through the input unit of the purchaser terminal 200.

In the operation of updating the sales status of the target product on the basis of payment intention information (S7000), the server 1000 may be implemented to acquire payment intention information related to the prospective purchaser and update the sales status on the basis of the payment intention information. Specifically, the server 1000 may acquire payment intention information including information on whether the prospective purchaser's payment for the target product is completed by a predetermined reference payment time and may update the sales status on the basis of the payment intention information.

Alternatively, although not shown in FIG. 3, the server 1000 may update the sales status of the target product on the basis of an input for deleting the target product from the prospective purchaser's shopping cart. Specifically, the server 1000 may update the sales status of the target product on the basis of when an input for deleting the target product from the shopping cart is acquired from the prospective purchaser.

The updating of the sales status of the target product according to an embodiment of the present disclosure will be described in detail below with reference to FIGS. 8 and 9.

Figure 8:
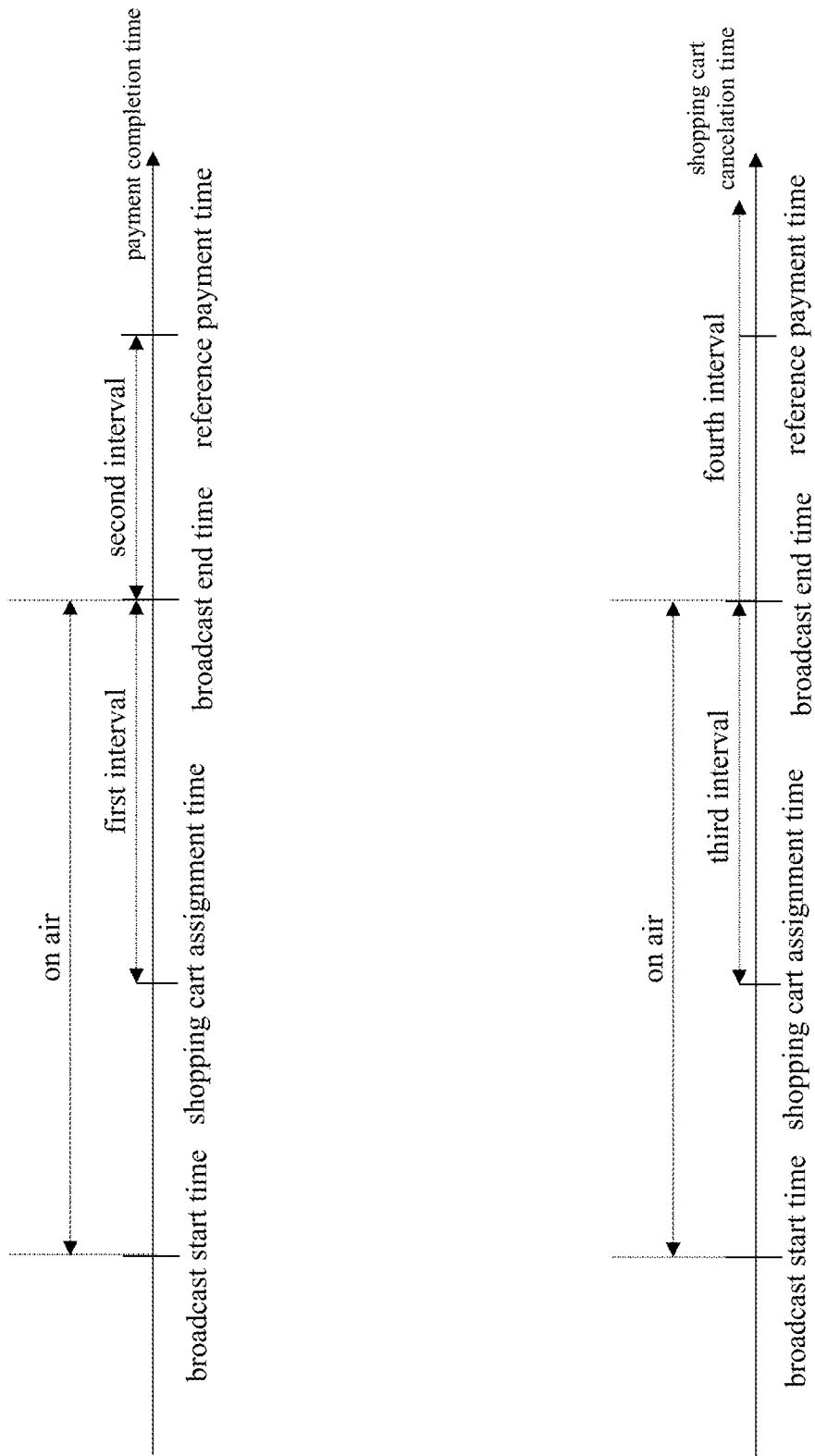
FIG. 8 is a timeline diagrammatically showing time intervals used to update a sales status.
Figure 9:
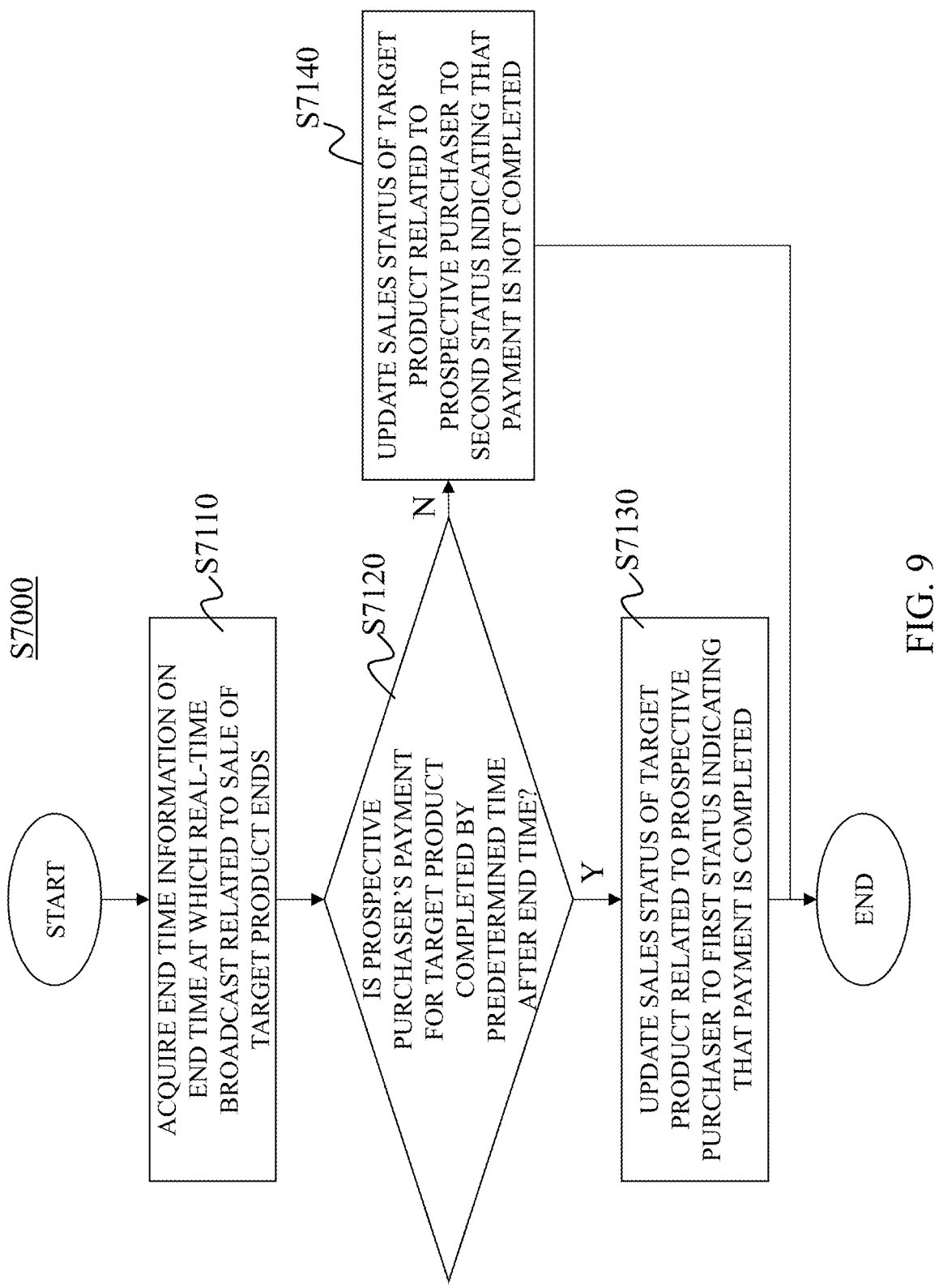
FIG. 9 is a detailed flowchart of an operation of updating a sales status of a target product according to an embodiment of the present disclosure.

FIG. 8 is a timeline diagrammatically showing time intervals used to update a sales status. FIG. 9 is a detailed flowchart of an operation of updating a sales status of a target product according to an embodiment of the present disclosure.

The operation of updating the sales status of the target product (S7000) may include operations of acquiring end time information on an end time at which a real-time broadcast related to the sale of the target product ends (S7110), determining whether the prospective purchaser's payment for the target product is completed by a predetermined time after the end time (S7120), updating the sales status of the target product related to the prospective purchaser to a first status indicating that the payment is completed on the basis of the determination that the payment is completed (S7130), and updating the sales status of the target product related to the prospective purchaser to a second status indicating that the payment has not been completed on the basis of the determination that the payment has not been completed (S7140).

In the operation of acquiring end time information on an end time at which a real-time broadcast related to the sale of the target product ends (S7110), the server 1000 may acquire the end time information on the end time at which the real-time broadcast related to the sale of the target product ends. For example, the server 1000 may acquire an input for causing the seller to end the real-time broadcast and may acquire the end time information on the basis of when the input is acquired. As another example, there may be a case in which the end time of the real-time broadcast is predetermined. In this case, the server 1000 may acquire information on the predetermined end time of the real-time broadcast.

In the operation of determining whether the prospective purchaser's payment for the target product is completed by a predetermined time after the end time (S7120), the server 1000 may determine whether the prospective purchaser's payment for the target product is completed by the predetermined time after the end time. The predetermined time may be preset. For example, the predetermined time may be within 1 minute to 24 hours. For example, the predetermined time may be within 30 minutes to 12 hours. For example, the predetermined time may be within 1 hour to 6 hours. For example, the predetermined time may be within 1 hour to 3 hours. For example, the predetermined time may be within 1 hour to 2 hours. However, these are only exemplary, and the predetermined time may be any suitable time.

As an example, the server 1000 may acquire any payment-related information including payment request information and/or payment completion information for the target product from the purchaser terminal 200. In this case, the server 1000 may compare time information on when the payment is completed to time information on when the predetermined time has elapsed (the reference payment time) to determine whether the prospective purchaser's payment for the target product is completed.

The server 1000 may update the sales status of the target product related to the prospective purchaser to a first status indicating that the payment is completed on the basis of the determination that the prospective purchaser's payment for the target product is completed by the predetermined time after the end time (hereinafter referred to as the reference payment time) (S7130).

For example, when the payment is completed in a first interval (e.g., an interval from a shopping cart assignment time to a broadcast end time in FIG. 8) or in a second interval (e.g., an interval from a broadcast end time to the reference payment time in FIG. 8), the server 1000 may determine that the prospective purchaser's payment for the target product is completed by the reference payment time and may update the sales status of the target product related to the prospective purchaser to the first status indicating that the payment is completed on the basis of a result of the determination.

On the other hand, the server 1000 may update the sales status of the target product related to the prospective purchaser to a second status indicating that the payment is not completed on the basis of the determination that the prospective purchaser's payment for the target product is not completed by the predetermined time after the end time.

For example, when the payment is not completed by the reference payment time, the server 1000 may determine that the prospective purchaser's payment for the target product is not completed and may update the sales status of the target product related to the prospective purchaser to the second status indicating that the payment is not completed on the basis of a result of the determination.

As described above, the server 1000 according to the embodiment of the present disclosure may update the sales status of the target product on the basis of an input for deleting the target product from the shopping cart. Specifically, when the target product is deleted from the prospective purchaser's shopping cart while the real-time broadcast is in progress (e.g.; at any time point included in the third interval of FIG. 8), there is a need to resell the target product. On the other hand, when the target product is deleted from the prospective purchaser's shopping cart after the real-time broadcast ends (e.g.; at any time point included in the fourth interval of FIG. 8), there is a need to impose a penalty on the prospective purchaser. Accordingly, the server 1000 according to the embodiment of the present disclosure may be implemented to update the sales status of the target product in consideration of when an input for deleting the target product from the shopping cart is acquired.

The update of a sales status of a target product according to another embodiment of the present disclosure will be described in detail below with reference to FIGS. 8 and 10. FIG. 10 is a detailed flowchart of an operation of updating a sales status of a target product according to another embodiment of the present disclosure.

The operation of updating the sales status of the target product (S7000) may include operations of acquiring an input for deleting the product information of the target product assigned to the shopping cart from the prospective purchaser (S7210), determining whether the deletion input is acquired while the real-time broadcast is in progress (S7220), updating the sales status of the target product related to the prospective purchaser to a third status indicating that the target product is deleted during the broadcast on the basis of the determination that the deletion input is acquired while the real-time broadcast is in progress (S7230), and updating the sales status of the target product related to the prospective purchaser to a fourth status indicating that the target product is deleted after the broadcast on the basis of the determination that the deletion input is not acquired while the real-time broadcast is in progress (S7240).

In the operation of acquiring an input for deleting the product information of the target product assigned to the shopping cart from the prospective purchaser (S7210), the server 1000 may acquire the input for deleting the target product from the shopping cart from the prospective purchaser. For example, the prospective purchaser may input an input for deleting the target product from the shopping cart (e.g., an input to a deletion button in FIG. 7) to the purchaser terminal 200 through any input unit (e.g., a mouse, a keyboard, a touchpad, etc.) of the purchaser terminal 200. In this case, the server 1000 may acquire an input that indicates an instruction for deleting the target product from the shopping cart from the purchaser terminal 200 through the transceiver 1100.

Figure 10:
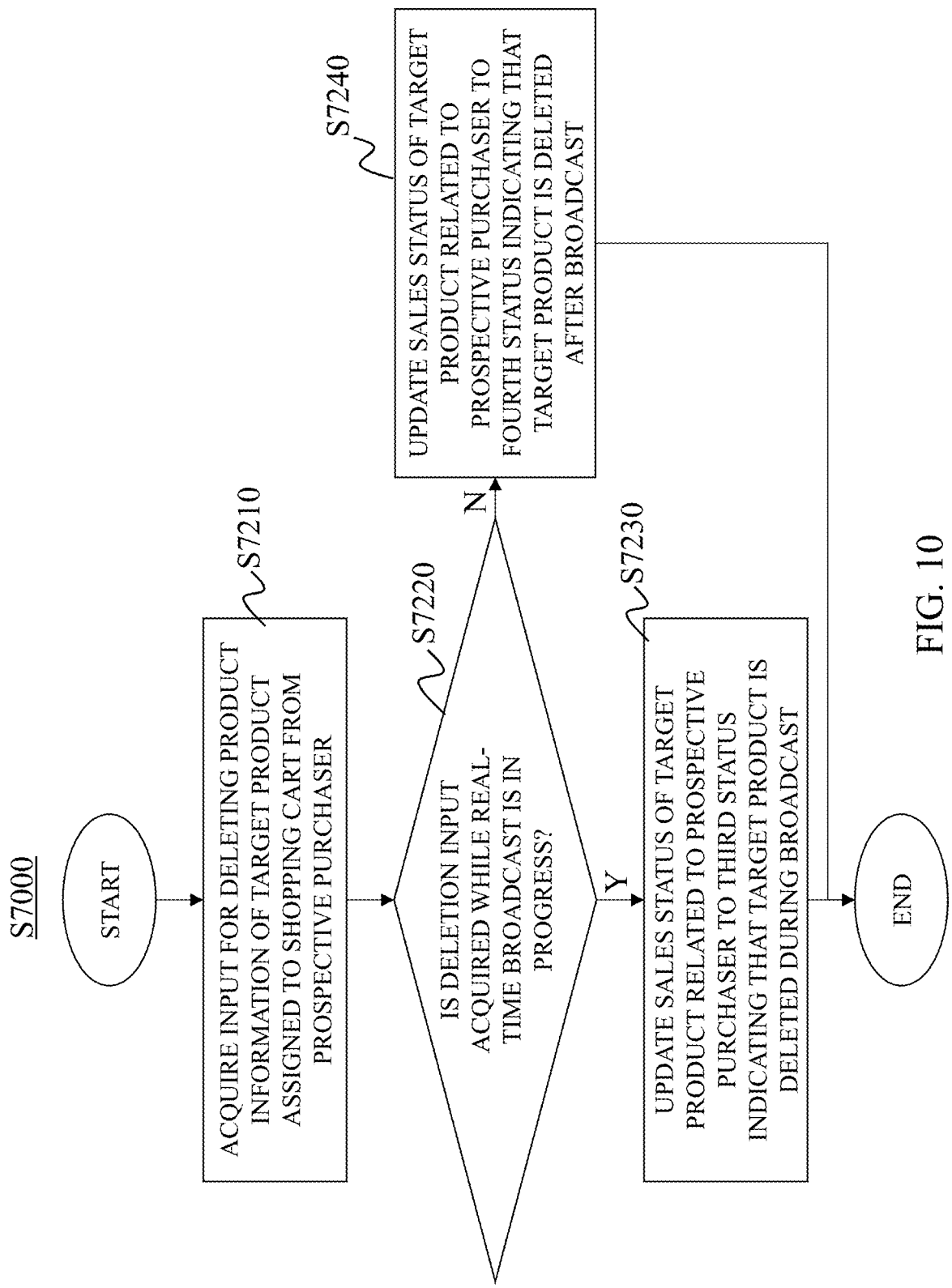
FIG. 10 is a detailed flowchart of an operation of updating a sales status of a target product according to another embodiment of the present disclosure.

Meanwhile, although not shown in FIG. 10, the server 1000 may also acquire information on transmission of a real-time broadcast image related to the sale of the target product.

In this case, the server 1000 may update the sales status of the target product, as will be described below, on the basis of the information on the transmission of the real-time broadcast image and the input for deleting the target product from the shopping cart.

In the operation of determining whether the deletion input is acquired while the real-time broadcast is in progress (S7220), the server 1000 may determine whether the deletion input is acquired while a real-time broadcast image is transmitted.

The server 1000 may update the sales status of the target product related to the prospective purchaser to the third status indicating that the target product is deleted during the broadcast on the basis of the determination that the deletion input is acquired while the real-time broadcast is in progress (S7230).

For example, when the input for deleting the target product from the shopping cart is acquired at any time included in the third interval, the server 1000 may determine that the deletion input is acquired while the real-time broadcast is in progress and may update the sales status of the target product related to the prospective purchaser to the third status indicating that the target product is deleted during the real-time broadcast on the basis of a result of the determination.

Also, although not shown in FIG. 10, the server 1000 may be implemented to resume the sale of the target product when the sales status of the target product is updated to the third status. For example, the server 1000 may update the stock status of the target product and may transmit a notification that the sale of the target product can be resumed to the seller terminal 100 and/or the purchaser terminal 200.

On the other hand, the server 1000 may update the sales status of the target product related to the prospective purchaser to the fourth status indicating that the target product is deleted after the broadcast on the basis of the determination that the deletion input is not acquired while the real-time broadcast is in progress (S7240).

For example, when the input for deleting the target product from the shopping cart is acquired at any time included in the fourth interval, the server 1000 may determine that the deletion input is acquired after the real-time broadcast is in progress and may update the sales status related to the prospective purchaser to the fourth status indicating that the target product is deleted after the real-time broadcast on the basis of a result of the determination.

The above description focuses on whether the point of time at which the input for deleting the target product from the shopping cart is acquired is before or after the end time of the real-time broadcast. However, this is only exemplary, and the time of determination at which the input for deleting the target product from the shopping cart is acquired may be appropriately selected. For example, when the input for deleting the target product from the shopping cart is acquired before a predetermined time elapses from the end time of the real-time broadcast, the server 1000 may update the sales status related to the prospective purchaser to the third status. Alternatively, when the input for deleting the target product from the shopping cart is acquired after a predetermined time elapses from the end time of the real-time broadcast, the server 1000 may update the sales status related to the prospective purchaser to the fourth status. For example, the predetermined time may be within 1 minute to 24 hours. For example, the predetermined time may be within 30 minutes to 12 hours. For example, the predetermined time may be within 1 hour to 6 hours. For example, the predetermined time may be within 1 hour to 3 hours. For example, the predetermined time may be within 1 hour to 2 hours. However, these are only exemplary, and the predetermined time may be any suitable time.

Meanwhile, when the prospective purchaser does not complete the payment for the target product by the reference payment time or when the prospective purchaser deletes the target product from the shopping cart after the real-time broadcast, the prospective purchase is highly likely to deprive other candidate purchasers of the opportunity to purchase the target product or cause a loss to the seller. Accordingly, when the sales state is updated to the second status or the fourth status, there is a need to impose a penalty on a relevant prospective purchaser.

Figure 11:
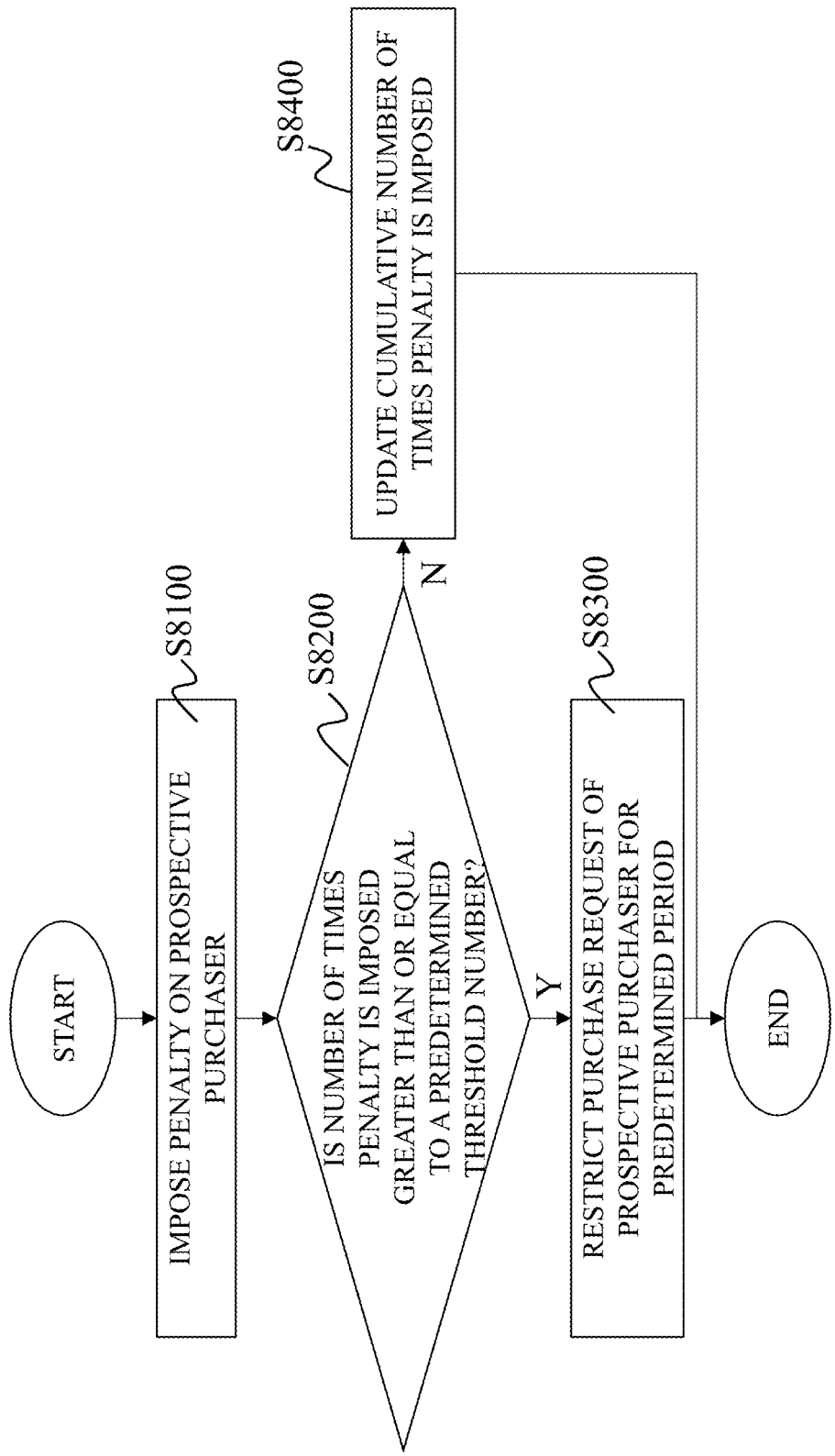
FIG. 11 is a detailed flowchart of an operation of updating a sales status according to another embodiment of the present disclosure.

The method of imposing a penalty according to an embodiment of the present disclosure will be described below with reference to FIG. 11. FIG. 11 is a detailed flowchart of an operation of updating sales status according to another embodiment of the present disclosure, and specifically, FIG. 11 is a flowchart of a method of imposing a penalty according to an embodiment of the present disclosure.

The operation of updating the sales status to the second status according to the embodiment of the present disclosure (S7140) (or the operation of updating the sales status to the fourth status (S7240)) may include operations of imposing a penalty on the prospective purchaser (S8100), determining whether the number of times the penalty is imposed is greater than or equal to a predetermined threshold number (S8200), restricting a purchase request of the prospective purchaser for a predetermined period on the basis of the determination that the number of times the penalty is imposed is greater than or equal to the predetermined threshold number (S8300), and updating the cumulative number of times the penalty is imposed on the basis of the determination that the number of times the penalty is imposed is less than the predetermined threshold number (S8400).

In the operation of imposing a penalty on the prospective purchaser (S8100), the server 1000 may be implemented to impose the penalty on the prospective purchaser when the sales status is updated to the second status (or the fourth status). Here, the penalty may encompass any appropriate type, which includes a form of restricting a purchase request for a product, of action related to users' use of the interactive product shopping system.

In the operation of determining whether the number of times a penalty is imposed is greater than or equal to a predetermined threshold number (S8200), the server 1000 may acquire penalty history information of the prospective purchaser and may determine that the number of times the penalty is imposed is greater than or equal to the predetermined threshold number on the basis of the penalty history information. Here, the threshold number may be preset to any suitable value. Also, the penalty history information may be configured to use only information for a certain period from the time of determination.

The server 1000 may be implemented to restrict a purchase request of the prospective purchaser for a predetermined period on the basis of the determination that the number of times the penalty is imposed is greater than or equal to the threshold number (S8300).

On the other hand, the server 1000 may be implemented to store or update the cumulative number of times the penalty is imposed on the prospective purchaser on the basis of the determination that the number of times the penalty is imposed is less than the threshold number (S8400).

With the interactive product shopping method, the interactive product shopping device, and the interactive product shopping system according to embodiments of the present disclosure, it is possible to efficiently manage the sales status of the target product by acquiring the product status of the target product in real time.

With the interactive product shopping method, the interactive product shopping device, and the interactive product shopping system according to embodiments of the present disclosure, it is possible to prevent a no-show and ensure a purchase opportunity for other purchasers by imposing a penalty based on the status of the real-time broadcast and the sales status of the target product.

The above-described various operations of the server 1000 may be stored in the memory 1200, and the processor 1300 of the server 1000 may be provided to perform the operations stored in the memory 1200.

With the interactive product shopping method, the interactive product shopping device, and the interactive product shopping system according to embodiments of the present disclosure, it is possible to efficiently manage the sales status of the target product by acquiring the product status of the target product in real time.

With the interactive product shopping method, the interactive product shopping device, and the interactive product shopping system according to embodiments of the present disclosure, it is possible to prevent a no-show and ensure a purchase opportunity for other purchasers by imposing a penalty based on the status of the real-time broadcast and the sales status of the target product.

The effects of the invention are not limited to the above-described effects, and other effects that are not described herein should be clearly understood by those skilled in the art from the above description and the accompanying drawings.

The features, structures, and effects described in the above embodiments are incorporated into at least one embodiment of the present invention but are not necessarily limited to only one embodiment. Moreover, features, structures, and effects exemplified in one embodiment can easily be combined and modified into another embodiment and then carried out by those skilled in the art. Therefore, these combinations and modifications should be construed as falling within the scope of the present invention.

While the present invention has been described with reference to embodiments, these are just examples and do not limit the present invention. It will be understood by those skilled in the art that various modifications and applications may be made therein without departing from the essential characteristics of the embodiments. That is, elements described in the embodiments above in detail may be modified. Furthermore, differences associated with such modifications and applications should be construed as being included in the scope of the present invention defined by the appended claims.

What is claimed is:

1. An interactive product shopping method using a server which includes a product database and is configured to acquire a product-sales-related real-time image from a seller terminal and display the product-sales-related real-time image on a purchaser terminal and acquires a purchase request for a product from the purchaser terminal and interactively determines a prospective purchaser of the product in response to the purchase request, the interactive product shopping method comprising operations of:

acquiring a real-time broadcast image related to a sale of a target product from the seller terminal;

acquiring product information of the target product, the product information including photo information, quantity information, and price information of the target product the operation of acquiring the product information comprises acquiring photo information of the target product from the real-time broadcast image acquired from the seller terminal and recognizing the product information of the target product based on a similarity between photo information of the target product stored in the product database and the photo information of the target product acquired from the real-time broadcast image;

acquiring information on a sales method of the target product, the sales method being related to at least one of a first-come-first-served sales method, an auction sale method, a lottery sales method, or a general sales method;

acquiring input information and identification information of a candidate purchaser who requests to purchase the target product;

determining a prospective purchaser of the target product on the basis of the quantity information of the target product and the input information of the candidate purchaser, wherein the operation of determining the prospective purchaser of the target product comprises detecting a phrase in a chat window, determining whether the detected phrase is a purchase request phrase, and determining, when the detected phrase is the purchase request phrase, a candidate purchaser who has inputted the phrase as the prospective purchaser of the target product;

acquiring shopping cart information of the prospective purchaser on the basis of the identification information of the prospective purchaser and assigning the product information of the target product to a shopping cart of the prospective purchaser; and acquiring payment intention information of the prospective purchaser and updating a sales status of the target product on the basis of the payment intention information, wherein the updating of the sales status of the target product on the basis of the payment intention information comprises:

acquiring a deletion input for the product information of the target product assigned to the shopping cart from a terminal of the prospective purchaser;

determining a time at which the deletion input is acquired from the terminal of the prospective purchaser, updating the sales status of the target product according to the time at which the deletion input is acquired from the terminal of the prospective purchaser, wherein the updating of the sales status according to the time comprises:

when the deletion input is acquired from the terminal of the prospective purchaser while a real-time broadcast related to the sale of the target product is in progress, updating the sales status of the target product to a status indicating that the target product is deleted from the shopping cart during the real-time broadcast, and when the deletion input is acquired from the terminal of the prospective purchaser after the real-time broadcast ends, updating the sales status of the target product to a different status indicating that the target product is deleted from the shopping cart after the real-time broadcast, and wherein the operations further comprise:

imposing a penalty on the prospective purchaser when the deletion input is acquired from the terminal of the prospective purchaser after the real-time broadcast ends, determining whether a number of times the penalty is imposed on the prospective purchaser is greater than or equal to a predetermined threshold number, and restricting a purchase request of the prospective purchaser for a predetermined period when it is determined that the number of times the penalty is imposed on the prospective purchaser is greater than or equal to the predetermined threshold number.

2. The interactive product shopping method of claim 1, wherein the operation of updating the sales status of the target product comprises operations of:

acquiring end time information on an end time at which the real-time broadcast related to the sale of the target product ends;

determining whether a prospective purchaser's payment for the target product is completed by a predetermined time after the end time; and updating the sales status according to whether the prospective purchaser's payment is completed, wherein when the payment is completed, the sales status of the target product related to the prospective purchaser is updated to a first status indicating that the payment is completed, and wherein when the payment is not completed, the sales status of the target product related to the prospective purchaser is updated to a second status indicating that the payment is not completed.

3. The interactive product shopping method of claim 2, wherein the operation of updating the sales status according to whether the prospective purchaser's payment is completed comprises operations of:

imposing a penalty on the prospective purchaser when the payment is not completed;

determining whether the number of times the penalty is imposed is greater than or equal to a predetermined threshold number; and restricting a purchase request of the prospective purchaser for a predetermined period on the basis of a result of the determination.

4. The interactive product shopping method of claim 1, wherein the operation of acquiring the product information of the target product comprises operations of:

transmitting a signal requesting photographing of the target product; and acquiring photo information of the photographed target product in response to the request.

5. The interactive product shopping method of claim 1, wherein the operation of determining the prospective purchaser of the target product comprises operations of:

determining whether the target product is in stock on the basis of the quantity information of the target product; and determining the candidate purchaser to be the prospective purchaser on the basis of a result of determining that the target product is in stock.

6. A non-transitory computer-readable recording medium in which a computer program executed by a computer is recorded, wherein when the computer program is executed by the computer, the program causes the computer to perform operations comprising:

acquiring a real-time broadcast image related to a sale of a target product from the seller terminal;

acquiring product information of the target product, the product information including photo information, quantity information, and price information of the target product the operation of acquiring the product information comprises acquiring photo information of the target product from the real-time broadcast image acquired from the seller terminal and recognizing the product information of the target product based on a similarity between photo information of the target product stored in the product database and the photo information of the target product acquired from the real-time broadcast image;

acquiring information on a sales method of the target product, the sales method being related to at least one of a first-come-first-served sales method, an auction sale method, a lottery sales method, or a general sales method;

acquiring input information and identification information of a candidate purchaser who requests to purchase the target product;

determining a prospective purchaser of the target product on the basis of the quantity information of the target product and the input information of the candidate purchaser, wherein the operation of determining the prospective purchaser of the target product comprises detecting a phrase in a chat window, determining whether the detected phrase is a purchase request phrase, and determining, when the detected phrase is the purchase request phrase, a candidate purchaser who has inputted the phrase as the prospective purchaser of the target product;

acquiring shopping cart information of the prospective purchaser on the basis of the identification information of the prospective purchaser and assigning the product information of the target product to a shopping cart of the prospective purchaser; and acquiring payment intention information of the prospective purchaser and updating a sales status of the target product on the basis of the payment intention information, wherein the updating of the sales status of the target product on the basis of the payment intention information comprises:

acquiring a deletion input for the product information of the target product assigned to the shopping cart from a terminal of the prospective purchaser;

determining a time at which the deletion input is acquired from the terminal of the prospective purchaser, updating the sales status of the target product according to the time at which the deletion input is acquired from the terminal of the prospective purchaser, wherein the updating of the sales status according to the time comprises:

when the deletion input is acquired from the terminal of the prospective purchaser while a real-time broadcast related to the sale of the target product is in progress, updating the sales status of the target product to a status indicating that the target product is deleted from the shopping cart during the real-time broadcast, and when the deletion input is acquired from the terminal of the prospective purchaser after the real-time broadcast ends, updating the sales status of the target product to a different status indicating that the target product is deleted from the shopping cart after the real-time broadcast, and wherein the operations further comprise:

imposing a penalty on the prospective purchaser when the deletion input is acquired from the terminal of the prospective purchaser after the real-time broadcast ends, determining whether a number of times the penalty is imposed on the prospective purchaser is greater than or equal to a predetermined threshold number, and restricting a purchase request of the prospective purchaser for a predetermined period when it is determined that the number of times the penalty is imposed on the prospective purchaser is greater than or equal to the predetermined threshold number.

7. A server for acquiring a product-sales-related real-time image from a seller terminal, transmitting the product-sales-related real-time image to a purchaser terminal, and interactively determining a prospective purchaser of a product, the server comprising: a product database; a transceiver configured to perform data communication with the seller terminal or the purchaser terminal; and a processor configured to interactively determine a prospective purchaser of a product, wherein the processor is configured to:

acquire a real-time broadcast image related to a sale of a target product from the seller terminal;

acquire product information of the target product, the product information including photo information, quantity information, and price information of the target product the operation of acquiring the product information comprises acquiring photo information of the target product from the real-time broadcast image acquired from the seller terminal and recognizing the product information of the target product based on a similarity between photo information of the target product stored in the product database and the photo information of the target product acquired from the real-time broadcast image;

acquire information on a sales method of the target product, the sales method being related to at least one of a first-come-first-served sales method, an auction sale method, a lottery sales method, or a general sales method;

acquire input information and identification information of a candidate purchaser who requests to purchase the target product;

determine a prospective purchaser of the target product on the basis of the quantity information of the target product and the input information of the candidate purchaser, wherein the operation of determining the prospective purchaser of the target product comprises detecting a phrase in a chat window, determining whether the detected phrase is a purchase request phrase, and determining, when the detected phrase is the purchase request phrase, a candidate purchaser who has inputted the phrase as the prospective purchaser of the target product;

acquire shopping cart information of the prospective purchaser on the basis of the identification information of the prospective purchaser and assigning the product information of the target product to a shopping cart of the prospective purchaser; and acquire payment intention information of the prospective purchaser and updating a sales status of the target product on the basis of the payment intention information, wherein the processor is further configured to:
acquire a deletion input for the product information of the target product assigned to the shopping cart from a terminal of the prospective purchaser;
determine a time at which the deletion input is acquired from the terminal of the prospective purchaser,
update the sales status of the target product according to the time at which the deletion input is acquired from the terminal of the prospective purchaser, wherein the processor is further configured to:
when the deletion input is acquired from the terminal of the prospective purchaser while a real-time broadcast related to the sale of the target product is in progress, update the sales status of the target product to a status indicating that the target product is deleted from the shopping cart during the real-time broadcast, and
when the deletion input is acquired from the terminal of the prospective purchaser after the real-time broadcast ends, update the sales status of the target product to a different status indicating that the target product is deleted from the shopping cart after the real-time broadcast, and wherein the processor is further configured to:
impose a penalty on the prospective purchaser when the deletion input is acquired from the terminal of the prospective purchaser after the real-time broadcast ends,
determine whether a number of times the penalty is imposed on the prospective purchaser is greater than or equal to a predetermined threshold number, and
restrict a purchase request of the prospective purchaser for a predetermined period when it is determined that the number of times the penalty is imposed on the prospective purchaser is greater than or equal to the predetermined threshold number.

8. The interactive product shopping method of claim 1, wherein the operation of determining the prospective purchaser of the target product further comprises:
acquiring penalty history information of candidate purchasers;
comparing the penalty history information of the candidate purchasers; and
determining that a candidate purchaser penalized less frequently is the prospective purchaser of the target product on the basis of a result of the comparison.

* * * * *